(12) United States Patent
Krulevitch et al.

(10) Patent No.: US 7,025,323 B2
(45) Date of Patent: Apr. 11, 2006

(54) LOW POWER INTEGRATED PUMPING AND VALVING ARRAYS FOR MICROFLUIDIC SYSTEMS

(75) Inventors: Peter A. Krulevitch, Pleasanton, CA (US); William J. Benett, Livermore, CA (US); Klint A. Rose, Livermore, CA (US); Julie Hamilton, Tracy, CA (US); Mariam Maghribi, Davis, CA (US)

(73) Assignee: The Regents of the University of California, Oakland, CA (US)

( * ) Notice: Subject to any disclaimer, the term of this patent is extended or adjusted under 35 U.S.C. 154(b) by 72 days.

(21) Appl. No.: 09/957,894

(22) Filed: Sep. 21, 2001

(65) Prior Publication Data

US 2003/0057391 A1 Mar. 27, 2003

(51) Int. Cl.
*F16K 31/124* (2006.01)
(52) U.S. Cl. .................... 251/11; 251/63; 417/490; 222/263
(58) Field of Classification Search .............. 251/11, 251/62, 63, 63.5, 63.6; 417/379, 390, 392, 417/490, 491, 492, 495; 222/132, 135, 263, 222/389, 395
See application file for complete search history.

(56) References Cited

U.S. PATENT DOCUMENTS

| | | | |
|---|---|---|---|
| 3,256,686 A * | 6/1966 | Lindberg, Jr. ................ | 60/516 |
| 4,499,149 A * | 2/1985 | Berger ......................... | 428/447 |
| 4,887,944 A * | 12/1989 | Worby et al. ............... | 417/490 |
| 4,938,742 A * | 7/1990 | Smits .......................... | 604/67 |
| 5,161,774 A | 11/1992 | Engelsdorf et al. ........... | 251/11 |
| 5,346,372 A * | 9/1994 | Naruse et al. ................ | 251/11 |
| 5,429,304 A * | 7/1995 | Tomita et al. ............. | 251/63.6 |
| 5,522,710 A * | 6/1996 | Duarte ......................... | 417/490 |
| 5,649,423 A * | 7/1997 | Sniegowski ................. | 60/531 |
| 5,671,905 A * | 9/1997 | Hopkins, Jr. .......... | 251/129.01 |
| 5,681,024 A | 10/1997 | Lisec et al. ................. | 251/11 |
| 5,839,467 A * | 11/1998 | Saaski et al. ............... | 137/501 |
| 5,992,820 A | 11/1999 | Fase et al. ............ | 251/129.01 |
| 6,003,535 A * | 12/1999 | Ollivier ........................ | 137/8 |
| 6,069,392 A * | 5/2000 | Tai et al. .................... | 257/419 |
| 6,129,331 A * | 10/2000 | Henning et al. ............. | 251/11 |
| 6,283,440 B1 * | 9/2001 | Evans .......................... | 251/11 |
| 6,283,718 B1 * | 9/2001 | Prosperetti et al. ........... | 417/52 |

FOREIGN PATENT DOCUMENTS

| | | | |
|---|---|---|---|
| FI | EP-1046823 A2 * | 10/2000 | |
| WO | WO 98/53236 | 11/1992 | |
| WO | WO 98/13605 | 4/1998 | |
| WO | WO 98/32616 | 7/1998 | |
| WO | WO 99/24744 | 5/1999 | |
| WO | WO 00/32972 A1 | 6/2000 | |
| WO | WO-2001/33614 | * 5/2001 | |

* cited by examiner

*Primary Examiner*—Eric Keasel
(74) *Attorney, Agent, or Firm*—James S. Tak; Alan H. Thompson

(57) ABSTRACT

Low power integrated pumping and valving arrays which provide a revolutionary approach for performing pumping and valving approach for performing pumping and valving operations in microfabricated fluidic systems for applications such as medical diagnostic microchips. Traditional methods rely on external, large pressure sources that defeat the advantages of miniaturization. Previously demonstrated microfabrication devices are power and voltage intensive, only function at sufficient pressure to be broadly applicable. This approach integrates a lower power, high-pressure source with a polymer, ceramic, or metal plug enclosed within a microchannel, analogous to a microsyringe. When the pressure source is activated, the polymer plug slides within the microchannel, pumping the fluid on the opposite side of the plug without allowing fluid to leak around the plug. The plugs also can serve as microvalves.

11 Claims, 8 Drawing Sheets

LOW POWER INTEGRATED PUMPING AND VALVING ARRAYS FOR MICROFLUIDIC SYSTEMS

The United States Government has rights in this invention pursuant to Contract No. W-7405-ENG-48 between the United States Department of Energy and the University of California for the operation of Lawrence Livermore National Laboratory.

BACKGROUND OF THE INVENTION

Field of the Invention

The present invention relates to microfluidic systems, particularly to the control delivery and manipulation of fluids in a microfluidic system, and more particularly to low power integrated pumping and valving arrays for microfluidic systems.

In the last decade, considerable research efforts have been devoted to the development of microfluidic systems, such as the Micro Total Analysis Systems (micro TAS). Instruments of such systems integrate microfabricated sensors, flow channels (microchannels), reaction chambers, pumps, and valves with control and data processing. Applications include miniature, portable and deployable instruments for detecting chemical and biological warfare agents, medical diagnostics, drug discovery, transdermal drug delivery via microneedles, and DNA analysis/sequencing. These prior are exemplified by U.S. Pat. No. 5,161,774 issued Nov. 10, 1992; U.S. Pat. No. 5,681,024 issued Oct. 28, 1997; and U.S. Pat. No. 5,992,820 issued in Nov. 30, 1999, along with International Applications No. WO 98/13605 published Apr. 2, 1998; No. WO 98/32616 published Jul. 20, 1998; No. 98/53236 published Nov. 26, 1998; and No. WO 99/24744 published May 20, 1999. Despite this effort, there is still a need for integrated, low power pumps and valves for manipulating fluids in the micro devices. This need has been emphasized in a recent $30 M call for proposals by the Department of Defense for microfluidic bio chips ("Bio Flips") to develop technologies that lead to total integration of peripheral functions onto single microchips, including innovative low power/pressure sources for on-chip fluidic manifolds.

SUMMARY OF THE INVENTION

It is an object of the present invention to satisfy the need for integrated, low power pumps and valves for manipulating fluids in micro-devices.

A further object of the invention is to provide low power integrated approach for performing pumping and valving operations in microfabricated fluid systems.

Another object of the invention is to provide low power integrated pumping and valving arrays (microsyringes) for microfluidic systems.

Another object of the invention is to integrate a low power, high-pressure source with a plug or piston enclosed within a microchannel for carrying out pumping and valving operations.

Another object of the invention is to provide a microfluidic pumping and/or valving arrangement, wherein a polymer, ceramic, or metal plug is pushed through a microchannel to either pump fluid therein or control fluid passing there-through.

Another object of the invention is to provide a low power, high-pressure source using micropumps and microvalves which include a slidable plug movable in a microchannel.

Another object of the invention is to create arrays of the microdevices, such as microsyringes, that can be operated independently to control microfluidic systems and to vary dose, and/or vary the fluid being injected.

Another object of the invention is to provide integrated pumping and valving arrays using slidable plugs for controlling complex fluidic processes on-chip.

Other objects and advantages of the present invention will become apparent from the following description and accompanying drawings. The invention involves low power integrated pumping and valving (microsyringes) for microfluidic systems. The invention produces a revolutionary approach for performing pumping and valving operations in microfabricated fluid systems for applications such as medical diagnostic microchips. The invention integrates a low power, high-pressure source with a polymer, ceramic, or metal plug enclosed within a microchannel, analogous to a microscale syringe. When the pressure source is activated, such as by heating a fluid, the plug slides within the microchannel, pumping the fluid on the opposite side of the plug without allowing fluid to leak around the plug. In other words, the plug forms a seal with the microchannel, which can be accomplished by using a compressible plug in a rigid channel or a rigid plug in a flexible channel. The fluid activated plug can function as a microvalve for controlling fluid passing through a microchannel. The integrated pumps/valves can be easily fabricated in array format for controlling complex fluidic processes on-chip. The invention can be used for example, for fluid control for portable and/or deployable chemical/biological warfare detection instruments, microfluid control systems for instruments that monitor military or civilian health, or to administer medication in response to biological threats, as well as in microfabricated microfluidic instrumentation for medical diagnostics, programmable drug delivery devices, drug discovery, or DNA analysis/sequencing. Thus, the present invention provides a solution to the above mentioned need for integrated, low pressure pumps and valves for manipulating fluids in microdevices.

BRIEF DESCRIPTION OF THE DRAWINGS

The accompanying drawings, which are incorporated into and form a part of the disclosure, illustrate embodiments of the invention and, together with the description, serve to explain the principals of the invention.

DETAILED DESCRIPTION OF THE INVENTION

The present invention is directed to low power integrated pumping and valving arrays for microfluidic system. The invention integrates a low power, high pressure source with a movable polymer, ceramic, or metal plug enclosed within a microchannel, analogous to a microscale syringe, with the plug being actuated by pressure generation mechanisms involving a chamber containing a fluid, which when heated, as a resistive heating element, either expands or creates bubbles in the fluid, which drives the plug. The pressure generation mechanisms include; liquid-vapor transformation or thermal expansion of the liquid (thermopneumatic), electro osmotic, electro kinetic, solid-liquid phase transformation, piezo-electric or magnetic microactuator pushing on a filled reservoir, shape memory alloy membrane actuator, and electrochemical. The driver plug either functions as a piston to drive a fluid through a microchannel, or functions as a valve to cut off or divert fluid flow in the microchannel. The thermopheumatically driven plugs, for example, may function as an array of pumps, valves, or combinations thereof and be incorporated in a microfluidic chip.

Figure 1:
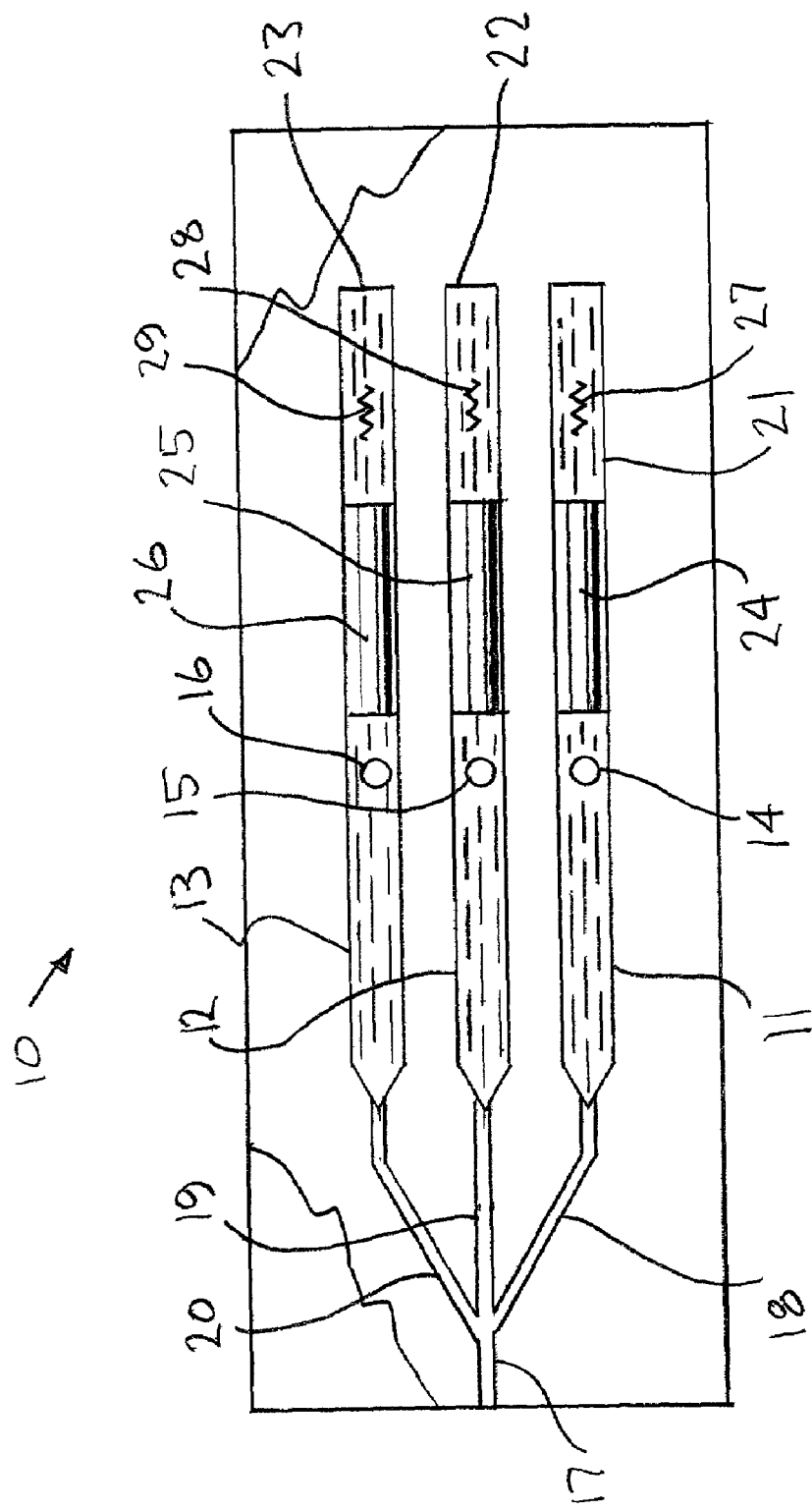
FIG. 1 illustrates a manifold chip with a plurality of thermopneumatic microsyringe (plug) pumps made in accordance with the present invention.

FIG. 1 illustrates an example of an integrated micropump or microsyringe manifold formed in a biofluidic chip with three pumps made in accordance with the invention for injecting different solutions into a common mixing/reaction chamber. Each of the three micropumps or microsyringes includes an etched or molded microchannel, a reservoir or supply containing the fluid sample, analyte, reagent or other solution required for the assay to be performed, connected to the microchannel via an inlet, a pressure generating thermopneumatic chamber, for example, comprising a fluid, a heating means, such as a resistive heater, and a plug or piston in alignment with the microchannel.

Applying a voltage across the resistive heater (which can also act as a temperature sensor by monitoring the variation in resistivity with power) causes a vapor bubble to form within the contained fluid, increasing the pressure within the sealed microchannel, and forcing the plug or piston to slide along the microchannel pushing (pumping) any solution ahead of the plug or piston when acting as a pump. When acting as a valve the plug or piston moves to open or close a transversely located fluid passageway, such as a microchannel. The plug or piston can slide within the microchannel. It's outer dimension is such that it forms a fluid seal with the channel surface, preventing fluids from leaking around the plug edges, this seal being provided by the use of a compressible plug and a rigid channel or rigid plug and flexible channel.

Referring now to FIG. 1, a microfluidic chip 10 is provided with three (3) microchannels 11, 12 and 13 which are adapted to be filled in inlets 14, 15 and 16 with a fluid or solution, such as a sample fluid, an analyte, a reagent, or other solution required for the assay to be performed. The microchannels 11–13 having one end connected to a common channel 17 via connector channels 18, 19 and 20. In alignment with microchannels 11–13 are three (3) thermopneumatic or pressure generating chambers 21, 22 and 23 containing a fluid. The chambers 21–23 constitute in this embodiment, end portions of the microchannels 11–13, and located therein are three (3) plugs or pistons 24, 25 and 26, constructed of a polymer, for example, for rigid channels. The plugs or pistons 24–26 have external surfaces which correspond to the internal surfaces of microchannels 1–13 whereby the plugs 24–26 can slide along the microchannels 11–13, but cooperate with the microchannel surface to form a seal to prevent fluid leakage. Each of the thermopneumatic chambers 21–23 is provided with a heater 27, 28 and 29, such as a resistive heater, each being individually controlled.

Upon activation of one or more of the heaters 27–29, a vapor bubble is formed in the fluid within corresponding chambers 21–23 increasing the pressure and causing the plugs or pistons 24–26 to move thereby ejecting/pumping the fluid (solution) in the microchannels forcing same along the microchannels to the common channel 17 and onto a point of use. Also, one piston at a time can be actuated.

Figure 2A:
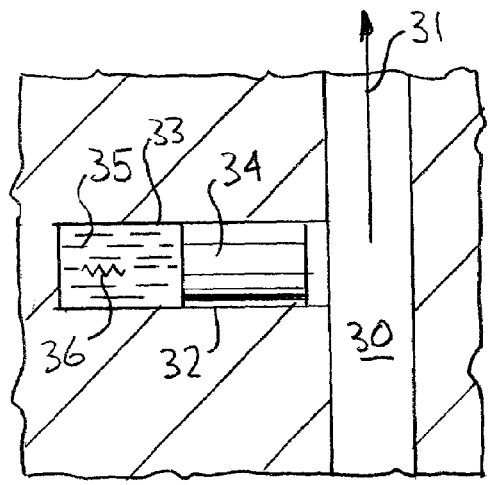
FIGS. 2A and 2B illustrate an embodiment of a thermopneumatic plug type valve assembly in a normally open position in FIG. 2A and closed position in FIG. 2B in accordance with the invention.
Figure 2B:
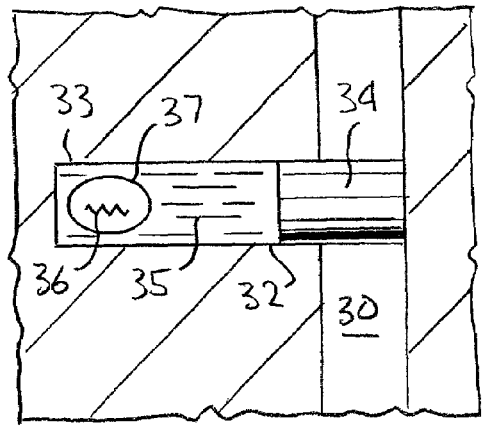

The same type of thermopneumatic chamber and sliding piston can be utilized in a T-configured microchannel arrangement for valving as shown in FIGS. 2A and 2B or 3A and 3B. As seen in FIGS. 2A–2B, a microchannel 30, such as the microchannels in FIG. 1, having a fluid flow there through as indicated by arrow 31 is provided with a transverse connecting channel 32 forming a T-configuration. Located in channel 32 is a thermopneumatic or pressure generating chamber 33, a plunger, plug, or piston 34, a fluid 35 contained in chamber 33, and a resistive heater 36. The device of FIG. 2A is shown in a valve open position. As shown in FIG. 2B, when fluid 35 is heated by heater 36, a vapor bubble 37 is created in fluid 35 which causes plunger 34 to move and close microchannel 30, a closed position, as seen in FIG. 2B. By control of the heater 36, the size of the bubble 37 can be controlled and thus the amount of movement of plunger 34 can be controlled, whereby the plunger 34 functions as a variable displacement valving member such that flow of fluid 31 through microchannel 30 can be controlled or stopped. The embodiment of FIGS. 2A–2B provides a normally open valve arrangement. These are one-time use valves. Also the valves can be configured as multiple use open-close valves, which is an important feature.

Figure 3A:
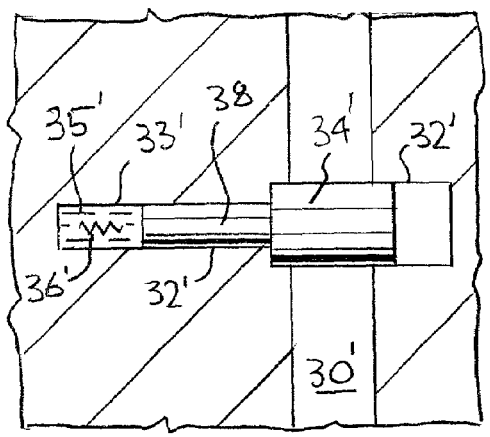
FIGS. 3A and 3B illustrate another embodiment of a microsyringe type thermopneumatic plug type valve with the valve being normally closed in FIG. 3A and open in FIG. 3B.
Figure 3B:
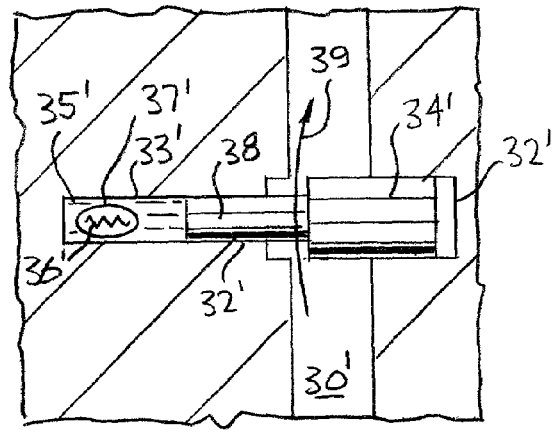

The embodiment of FIGS. 3A–3B provides a normally closed valve arrangement, and corresponding components have been given corresponding reference numerals. In this embodiment channel $32^1$ extends across channel $30^1$ and heating of the fluid $35^1$ in chamber $33^1$ by resistive heater $36^1$ creates bubble $37^1$ and forces movement of plunger or piston $34^1$ to move, as shown in FIG. 3B. Plunger $34^1$ has reduced diameter section 38 which extends into channel $30^1$ and allows fluid to flow through channel $30^1$ as indicated by arrow 39. The device of FIGS. 3A–3B could have two thermopneumatic sources to open and close the valve.

Advantages of the thermopneumatic/plug pump or valve arrangement include:

1. Compact design, suitable for chip-scale integration.

2. Low power, with the devices consuming zero power when idle, and minimal power (milliwatts) over a short time period when activated. The valve, or fluidic switch, requires no power when the channel is in an open state, and no power when the channel is closed after actuation, unlike most valves which require power in one state or the other.

3. Ability to fabricate arrays of devices, taking advantage of batch/fabrication processes (low cost, reduced manual assembly), without compromising small size.

4. Sensitive biological working fluids are thermally isolated form the actuation portion of the device.

5. Fluids can be stored and sealed within the device for long shelf life.

The following table summarizes the features of the present invention compared to existing technology.

TABLE

| Pump/Valve | Power | Size | Other |
| --- | --- | --- | --- |
| Microsyringe | mW Power only required when switching | Same scale as microchannels | Arrays possible, controlled fluid pumping, does not heat working fluid. |
| External Pressure-Driven Pumps & Valves | mW-Watts Power determined by macrovalves | Large external pressure source and valve manifolds | External pressure effectively control microfluidic devices |
| Redwood Thermopneumatic Valve | mW-Watts Power required to maintain one state | 4 mm diameter footprint (large in comparison to chip) | Can seal against high pressures. Too large for arrays on single chip, heats working fluid. |
| Electoosmotic Pumping | High voltage required | Large external power source required | Arrays possible, no moving parts, electrolysis an issue, must work with conductive solution, sensitive to surface properties of microchannel. |
| Piezoelectric Disc Pump | High voltage required (100's of volts) | 5–10 mm discs required. Large power supply. | Disc are too large for arrays on single chip, cavitation can be a problem. |
| Magnetohydrodynamic Pump | Watts | Requires relatively large external magnet and power supplies | Must work with conductive solution, fluid not contained when pump is inactive. |

As an example, the integrated system comprises a chip-scale microfluidic system that incorporates, for example, a thermopneumamtic/plug (microsyringe) approach of the invention can be fabricated by existing technology for controlling injection and valving of various fluids in order to prepare blood samples for RNA analysis. The single chip integrates the following functions:

1. Microbiopsy to collect blood or tissue samples.
2. Introduce osmotic solution to burst the red cells.
3. Filter out the cellular debris.
4. Lyse the white blood cells with a gunadinuim solution.
5. Introduce ethanol to precipitate out the RNA.
6. Wash the RNA with ethanol.
7. Dry off the ethanol.
8. Elute the RNA into the polymerase chain reaction (RCR) chamber.
9. Perform the reverse transcriptase and PCR in conjunction with real-time detection.

Figure 4:
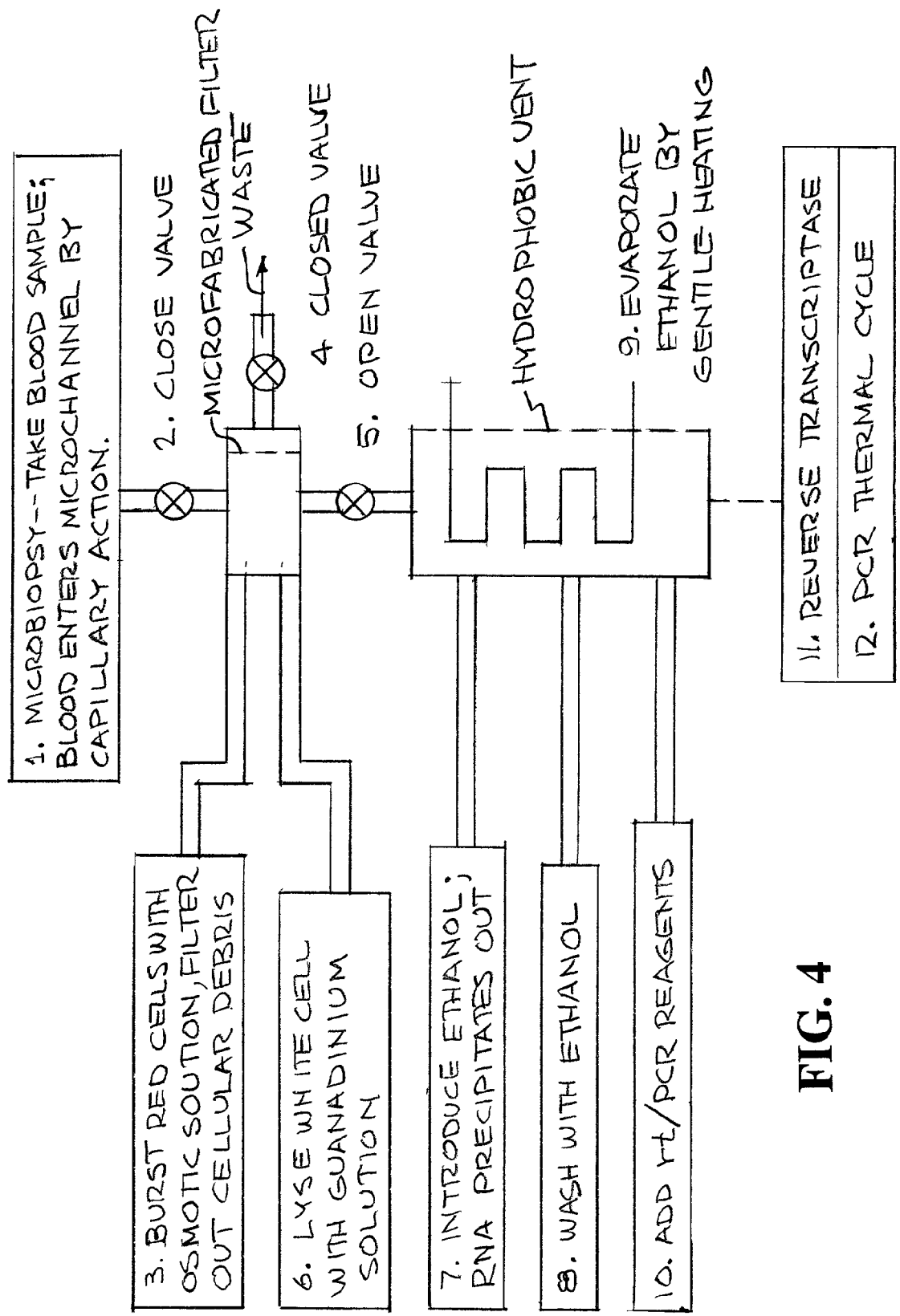
FIG. 4 illustrates an exemplative sequence or functions integrated by a single chip when utilizing several integrated thermally activated plugs as pumps and as valves.

The above described sequence is illustrated in FIG. 4. When injecting solution into a chamber, a plug, or cork-like seal may be used to initially isolate the fluid from the other solutions. Upon actuation of the syringe, the pressure generated uncorks this plug, allowing the fluid to be injected to the chamber. The plug will either be trapped in a downstream section of microchannel such that fluid can flow around it, or it will be allowed to enter the reaction chamber where it will not adversely affect the reaction. Likewise, for step 5 in FIG. 4, to open the valve, a plug will be uncorked from a narrow section of channel with a microsyringe device that uses water as a working fluid.

Figure 5:
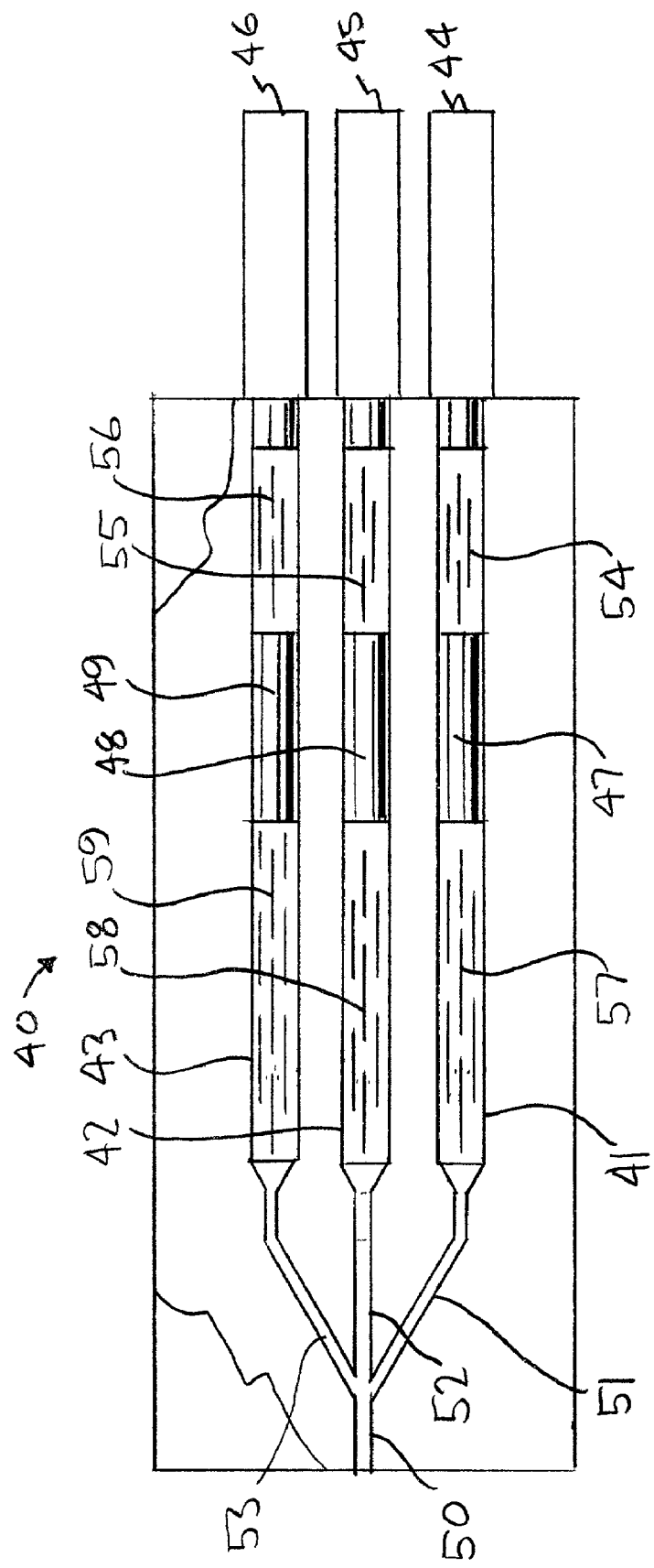
FIG. 5 illustrates a stepper microsyringe pump similar to FIG. 1, but interfaced to external piston actuators.

As shown in FIG. 5, a microfluidic chip, generally similar to FIG. 1 and indicated at 40, includes three (3) microchannels 41, 42, and 43 which are interfaced to external piston actuators 44, 45, and 46, or other internal pressure sources/micropumps can also be used to drive micro-syringes or pistons 47, 48 and 49 located in microchannels 41–43, respectively. The microchannels 41–43 have one end connected to a common channel 50 via connector channels 51, 52 and 53. External piston actuators 44–46 direct fluid indicated at 54, 55 and 56 against pistons 47–49 causing pistons 47–49 to move against the fluid 57, 58 and 59 forcing the fluid into common channel 50. However, each of pistons 47–49 can be actuated independently.

The plug is most readily moved through a microchannel having a configuration corresponding to the external configuration of the plug. Generally, a circular shaped microchannel and corresponding configured plug is preferable, although other shapes having rounded corners are acceptable. Recently, a process has been developed for producing circular microchannels in glass, and is described and claimed in copending U.S. application Ser. No. 09/(IL-10581), filed May 7, 2001, entitled "Method for Producing Microchannels Having Circular Cross-Sections in Glass", assigned to the same assignee. In that method a substrate having etched microchannels is bonded to a top plate and then annealed to allow surface tension forces and diffusional effects to lower the overall energy of the microchannel by transforming the cross-section to a circular shape.

An important aspect of the polymer microchannel with hard plug implementation is the method for forming a perfectly round channel, which is essential for achieving a seal. This was done by casting the polymer around a smooth, fine-diameter wire or pin, then removing the wire or pin after the polymer has cured.

The polymer channel should be hydrophobic to improve the seal. Since surface effects dominate fluid flow on the microscale, optimal fluid loading and channel sealing is dependant on selective poly (dimethylsiloxane) (PDMS) surface modifications. The polymer channel should be hydrophobic and pneumatic fluid should be hydrophilic when using hydrophilic reagents or vice versa (Polymer channel should be hydrophilic and pneumatic fluid should be hydrophobic when using hydrophobic reagent) for leak proof seal.

Another approach to the formation of circular cross-section microchannels, as mentioned above involves molding or embedding of wires or round members of a desired diameter in a desired configuration creating a mold to pour polydimethylsiloxane (PDMS) in, and then pulling out the wire or member following the curing process which creates perfectly circular channels. In addition to PDMS, other silicones, or other polymers may be used. This results in a flexible microfluidic device with perfectly circular and smooth channels that can be applied in various biomedical microdevices and other microsystems. This process is both time and cost effective due to the simplicity of the approach. An example of a channel made using this technique has been shown in an SEM cross-sectional image, and small hard balls have been loaded into these soft PDMS channels and have been driven with an external pneumatic actuator (syringe). Fluid was successfully pumped using the microsyringe, with the balls forming effective seals against the PDMS microchannels.

Figure 7A:
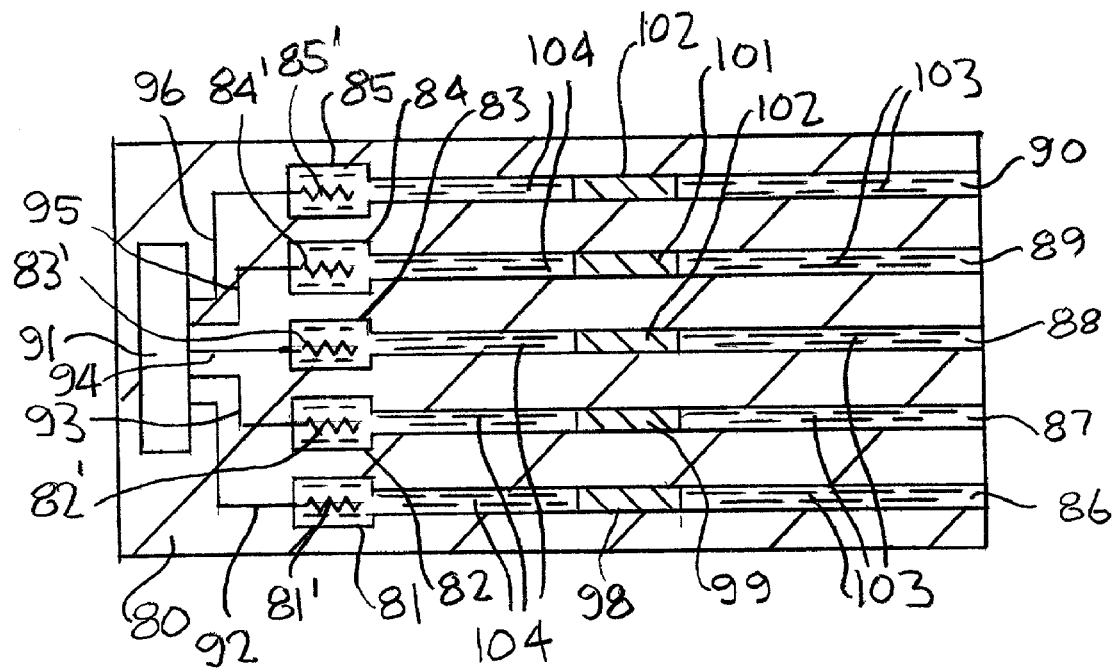
FIGS. 7A and 7B illustrates top and side views of a microsyringe array application, such as transdermal drug delivery via microneedle.
Figure 7B:
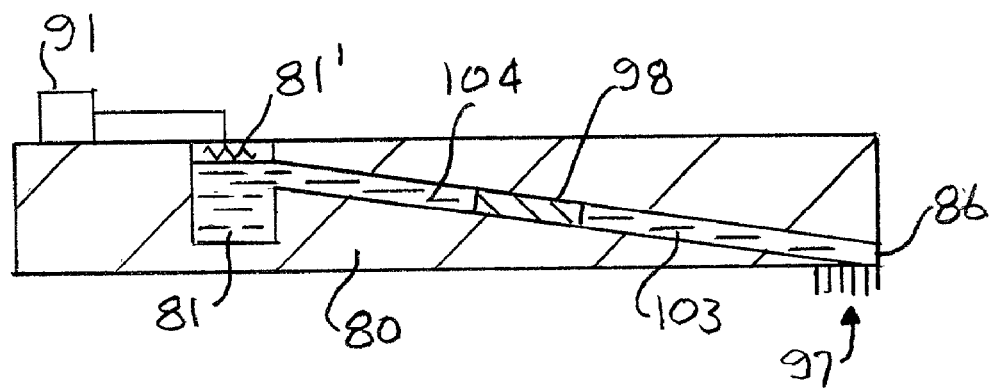

One of the target applications of these integrated microsyringes is a Transdermal drug delivery patch via microneedles as illustrated in FIGS. 7A and 7B, and described hereinafter. This device is a programmable multidosage/multidrug delivery patch that will employ microneedles to facilitate the transdermal diffusion process, which is the critical hindrance of conventional systems. Each microsyringe will contain one preset dosage that would be delivered at a rate to achieve the drug concentration that maximizes therapeutic effect and minimize side effects. The Microsyringes in the array could contain the same drug or different drugs.

Another application is for Biological/Chemical manipulation and analysis. This will be used for Environmental and Medical diagnostics.

Another application is cell manipulation and testing. For example the microchannels would be ideal for making flow chambers for biofluidics and cellular mechanics experiments. The Circular cross section of the channels mimics the physiological nature of blood vessels and the optical properties of PDMS would allow for easy visualization.

Figure 6A:
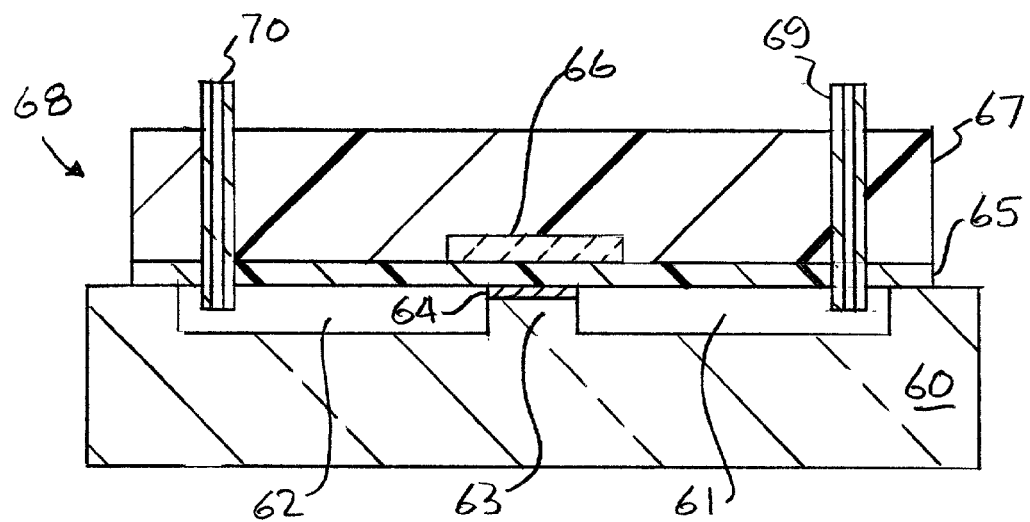
FIGS. 6A and 6B illustrate an embodiment of a piezo electric controlled valve for microfluidics.
Figure 6B:
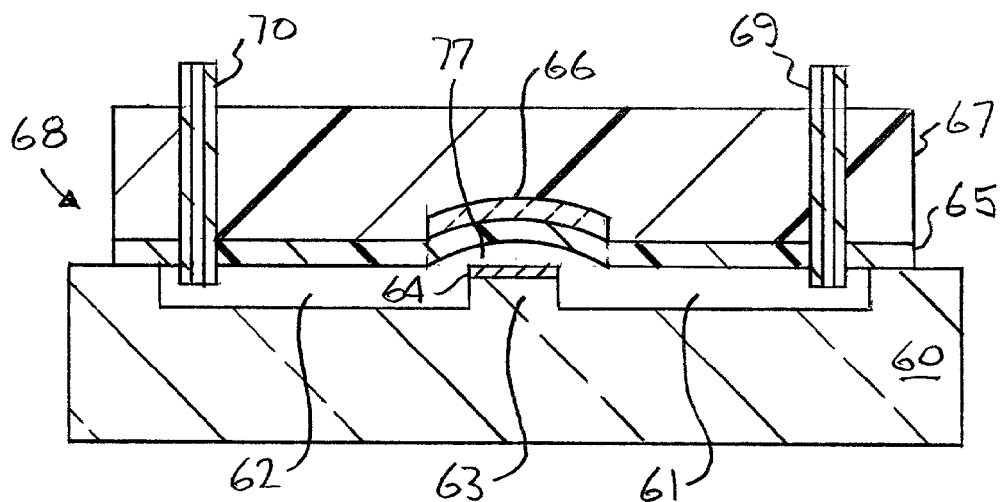

FIGS. 6A and 6B illustrate a piezo controlled valve for microfluidics. The valve assembly comprises a glass substrate 60 having a pair of microchannels 61 and 62 etched therein to a depth of 40 microns, for example, with the glass intermediate the pair of microchannels forming a seat or closure 63 for the valve. A thin (0.1 micron) gold layer 64 was sputtered onto the top surface of seat 63 and then patterned into a 700 micron diameter circle, for example using a mask and photolithography. A 300 micron thick PDMS film 65 was produced using two flat surfaces as a press and then curing. The film 65 was then bonded on the glass substrate 60 to cover the channels 61 and 62 and the gold circle layer 64 using standard soft lithography bonding techniques. Then two radically expanding ceramic piezos were epoxied together forming a bimorph 66, which bends when provided with a voltage because one piezo expands while the other contracts. Wires, not shown, were expoxied onto the top and bottom of the bimorph 66 for providing desired current to the piezos. The bimorph was dipped in pre-cured PDMS to provide an initial bond to the PDMS film, and the piezo bimorph 66 was bonded to film 65 so as to be over the gold circle 64 of seat 63 connecting the two channels 61 and 62. Precured PDMS was then poured all around the piezo bimorph 66 and the film 65 to provide a backing and support 67 with the composite films being shown generally at 68 with the piezo bimorph 66 embedded there. The entire structure was cured for 1 hour at 120° C. Two holes were bored through the PDMS film composite 68 at both ends of the channel 61 and 62 and peek tubing 69 and 70 were inserted therein to provide a fluid inlet and a fluid outlet. As shown in FIG. 6A, the valve is closed, and upon a voltage being applied the piezo bimorph 66 bends, and this bending lifts the PDMS membrane or film 65 from the gold layer 64 of seat 63, and opens a path 71 between channel 61 and 62 as seen in FIG. 6B. When the voltage is reversed, the piezo bimorph 66 presses the film 65 downward against the gold layer 64 creating a sealed valve between the two channels 61 and 62, as seen in FIG. 6A. Application of 100 volts at low frequencies such as 10 Hz has been successful in bending the film 65 and actuating the valve. This device also can be used to generate pressure for the microsyringe.

FIGS. 7A and 7B illustrate top and side views of a microsyringe array for an application involving transdermal drug delivery via microneedles. A PDMS substrate 80 is provided with a plurality of thermopneumatic chambers which may include resistive heaters 81'–85' and indicates at 81, 82, 83, 84 and 85 each chamber connected to a respective channel 86, 87, 88, 89 and 90 formed in the substrate 80. Each chamber 81–85 is connected to a programmable chip or microchip controller 91 via leads 92, 93, 94, 95 and 96. Channels 86–90 are each provided at an outer end with a plurality of microneedles 97 (see FIGS. 7B) and each channel 86–90 contains a piston 98, 99, 100, 101 and 102 and is provided with a desired reagent 103 intermediate pistons 98–102 and microneedles 97. The reagent 103 in each of the channels 86–90 may be the same or different, depending on the desired application. Each channel 86–90 contains a driving or actuation fluid 104 located intermediate pistons 98–102 and thermopneumatic chamber 81–85.

In operation, one or more resistive heaters 81'–85' heat fluid in thermopneumatic chambers 81–85 which cause the expansion of the driving fluid 104 and movement of one or more pistons 98–102 along channels 86–90 forcing the desired reagent 103 toward microneedles 97 for delivery of the reagent to a patient or other point of use.

The Channels in FIGS. 7A and 7B may be formed by embedding wires of the desired diameter into the PDMS and then pulling out the wire following the curling process creates perfectly circular channels. This results in a flexible microfluidics device with perfectly circular and smooth channels that can be applied in various systems such as drug delivery devices. The shape is not limited to only circular channels, but other desired structures and shapes like cork screw shape channels or spring like springs could be obtained. This process is both time and cost effective due to its simplicity and quick turnover. The channels can be fabricated in an hour and the cost is tremendously reduced since no microfabrication techniques are employed. Previous methods to fabricate circular channels encountered numerous difficulties including alignment problems, etching defects, the inability to produce perfectly circular channels, time consuming and costly labor.

Figure 8A:
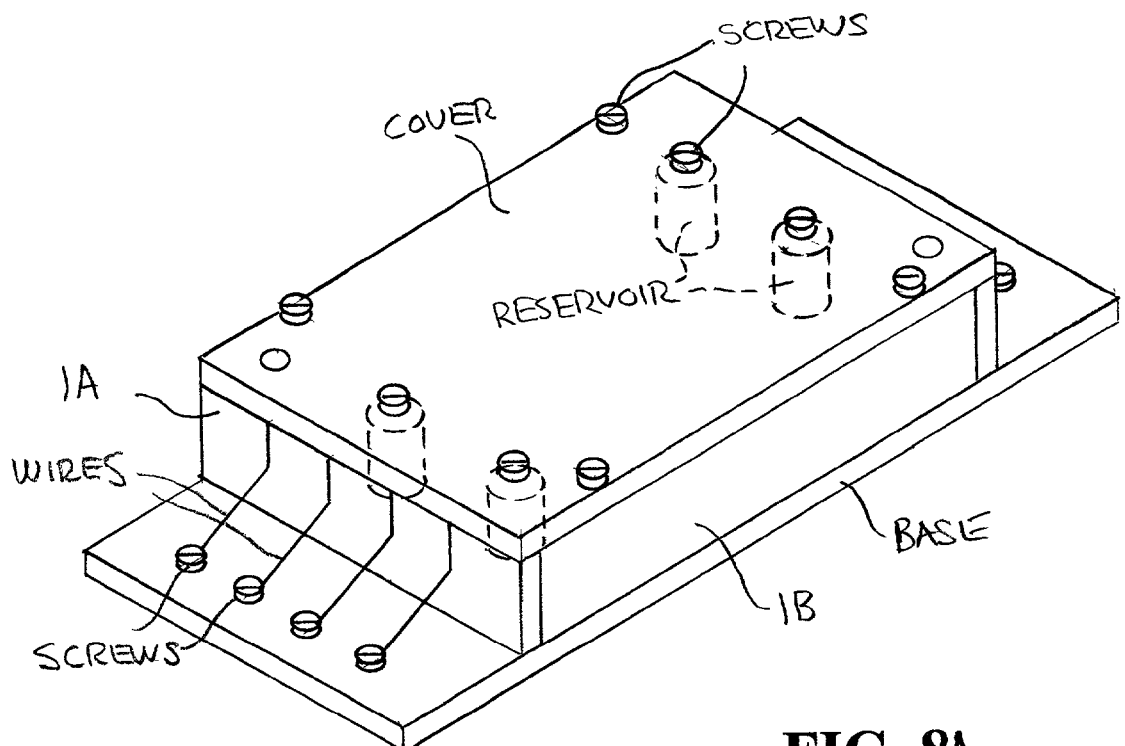
FIGS. 8A and 8B and FIGS. 9A and 9B illustrate first and second molds for producing a frame fixture assembly.
Figure 8B:
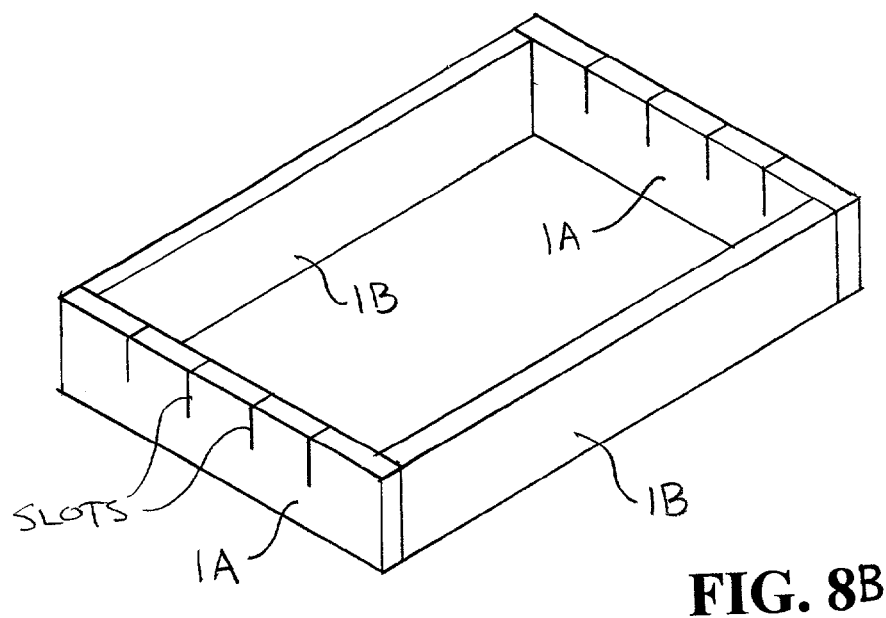
Figure 9A:
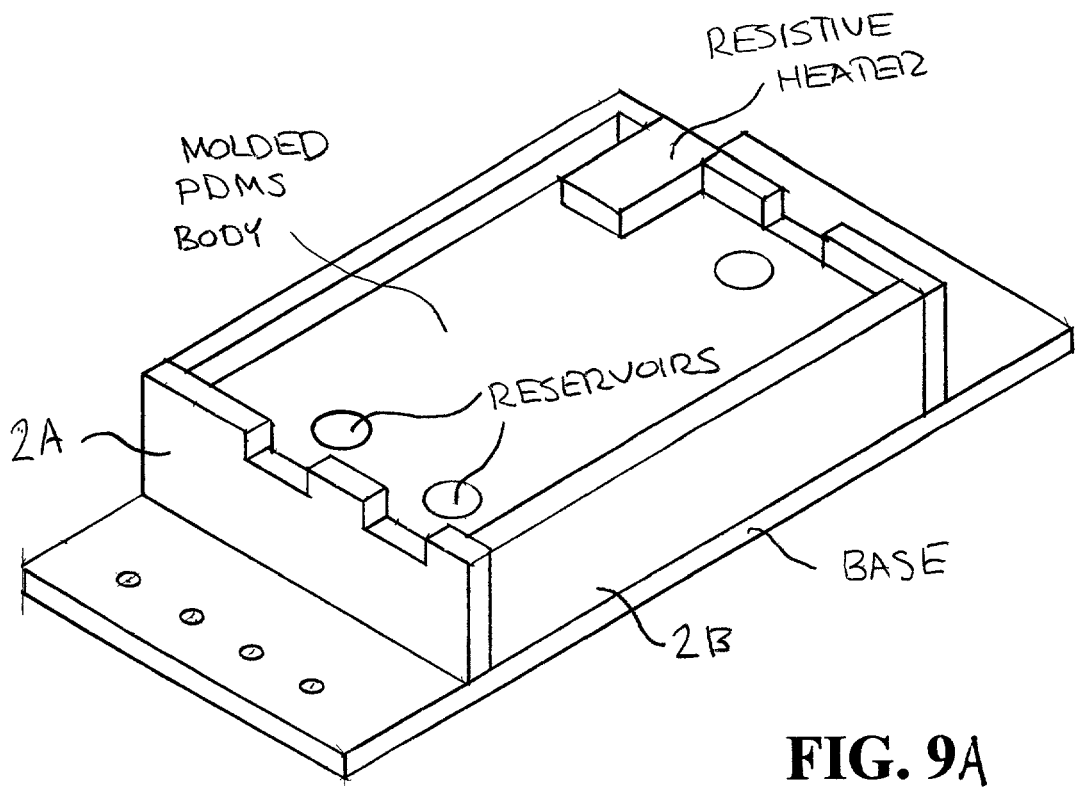
Figure 9B:
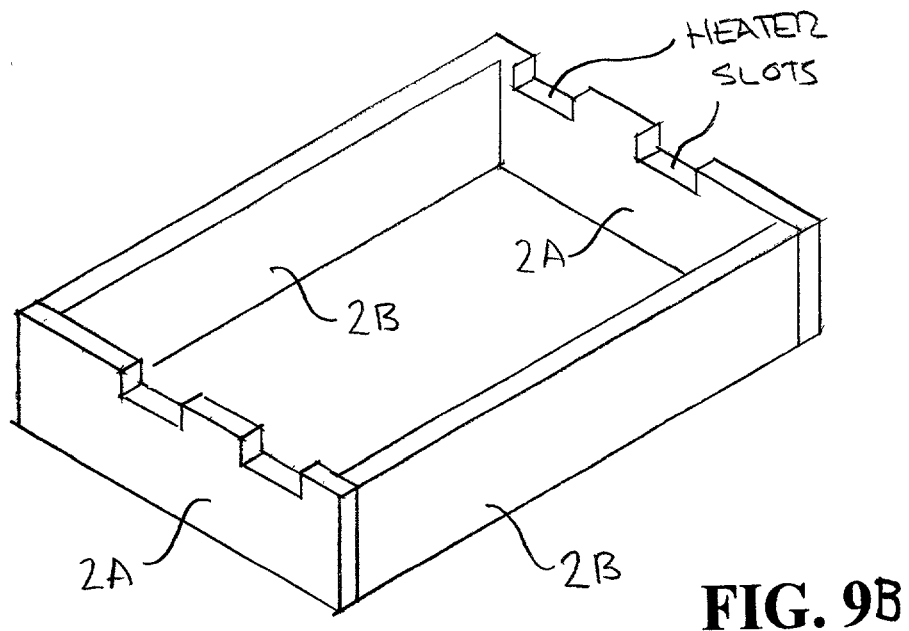

The following description in accompaniment with FIGS. 8A–8B and 9A–9B illustrate an application of the PDMS or polydimethyl (siloxane) process. FIG. 8A is a 3-D overall of a first mold, with FIG. 8B being a top view of the frame for the first mold. FIG. 9A is a 3-D overall of a second mold, and FIG. 9B is a top view of the frame for the second mold. The process is as follows:

1. Mix PDMS (Sylard® 184 from Dow Corning) with curing agent in 10:1 ratio respectively.
2. Stir well and degas to releases all the air bubbles.
3. Frame fixture assembly of FIGS. 8A–8B and 9A–9B
   a. Frame fixture consists of metal base with four walls. For reference we will call the End-walls 1A for first mold (FIGS. 8A–8B) and 2A for second mold (FIGS. 9A–9B). The side-walls will be 1B for first mold and 2B for second mold.

b. The 1A end-walls have slits in them to accommodate for wires strung to mold channels. (There is no limit on the number of channels to make.)

c. Reservoir mold pieces are screwed on to the acrylic top cover.

d. Desired diameter wires are threaded through reservoir mold pieces.

e. The Acrylic cover, containing the reservoirs and wires, is screwed to the top of the frame.

f. The wires are tightened using end screws on the frame bed.

g. Inject PDMS through one of the fill port on top of the frame. The other fill port is to allow air out so bubbles are trapped.

4. Cure for 1 hr. @ 66° C.

5. Cut wires and pull past reservoir and remove reservoir piece. Do not pull wires all the way out. Keep wires in while in the plasma etcher to prevent channels from becoming oxidized. If channels become oxidized there will not be a tight seal between the piston and the channels, which will result in leakage. Oxidizing the reservoir on the other hand helps minimize the air bubble formation when filling later. Also protects channel from getting refilled during second mold process.

6. Replace the 1A end-walls with heater frame 2A end-walls to accommodate heaters and replace 1B side-walls with 2B. Notice 2A and 2B are a little higher than previous walls to accommodate the $2^{nd}$ molding process.

7. Place piston in channel through the reservoir port as seen in FIG. 2A.

8. Clean heaters with ethanol and dry.

9. Place tape on heater pads to protect pads when spinning on PDMS.

10. Spin PDMS onto glass heaters (Resistive heaters on glass) to assure bonding where the platinum resistive heaters are.

11. Apply heaters on a. Clean PDMS with ethanol and dry b. Place both heaters and PDMS part in plasma etcher for 1 min to oxidize surface to form bond i. RF @ 100 watts ii. Oxygen flow 12. After applying heaters remold PDMS on top to cap in the heaters 13. Cure for 1 hour @ 66° C.

14. Remove PDMS from the fixture

15. Remove the wires

16. Fill actuation reservoir with desired actuation fluid and seal with bullet like cork made from glass or silicon. Or seal with wire rod dipped in silicon. The size of the rod should be double the size of wire used to mold the channel.

17. Fill channel with regent or drug to be delivered.

It has thus been shown that the present invention has provided a new approach for performing pumping and valving operations in microfabricated fluid systems for applications such as medical diagnostic microchips. The invention provides for low power integrated pumping and valving arrays. By the use of the thermopneumatic chamber/plug the device can be effectively utilized as either an injection pump or as a control valve, with the valve having a variable operational capability. A chip scale integrated sample preparation system can be produced utilizing the invention.

While particular embodiments of the invention have been described and illustrated, such are not intended to be limiting. Modifications and changes may become apparent to those skilled in the art and it is intended that the invention be limited only the scope of the appended claims.

The invention claimed is:

1. In a microfluidic system having at least one microchannel, the improvement comprising: a plug-actuation device, having a fluid driven plug in a microchannel and a pressure generation mechanism adjacent an outer surface of the fluid driven plug, said pressure generation mechanism adapted to drive the plug to slide along the microchannel in a direction away from the pressure generation mechanism when pressure is generated thereby, said device having functions selected from the group consisting of pumping and valving, wherein for pumping the fluid driven plug displaces a fluid located in the microchannel adjacent an outer surface of the plug opposite the pressure generation mechanism, and for valving the fluid driven plug occludes and/or opens a path of another transversely-situated microchannel.

2. The improvement of claim 1, wherein said fluid driven plug of said plug-actuation device is constructed to prevent leakage of fluid thereby.

3. The improvement of claim 1, wherein said pressure generation mechanism operates thermopneumatically and includes a pressure generating chamber, a fluid contained in the pressure generating chamber and bordered in part by the fluid driven plug, and means for heating said fluid to generate pressure within the chamber and thereby drive the fluid driven plug.

4. The improvement of claim 1, wherein said plug-actuation device is located in one end of said at least one microchannel.

5. The improvement of claim 1, wherein said pressure generation mechanism operates thermopneumatically and includes a quantity of contained fluid and means for heating said contained fluid, whereby heating of said contained fluid causes movement of said fluid driven plug.

6. The improvement of claim 1, wherein said plug-actuation device operates thermopneumatically as a pump and said pressure generation mechanism further includes:

a pressure generating chamber, a fluid contained in said pressure generating chamber and bordered in part by said fluid driven plug, and means for heating said fluid causing movement of said fluid driven plug.

7. The improvement of claim 6, wherein said plug-actuation device is located in a section of said at least one microchannel, and wherein movement of said fluid driven plug causes movement of fluid located in said microchannel.

8. The improvement of claim 6, wherein said means for heating said fluid comprises a resistive heater.

9. The improvement of claim 1, wherein said plug-actuation device is selected from the group of devices consisting of thermopneumatic, electro osmotic, electrokinetic, solid-liquid phase transformation, piezoelectric, magnetic, shape memory alloy membrane, external pressure and electrochemical.

10. The improvement of claim 9, wherein said plug-actuation device comprises of a thermopneumatic device.

11. A microfluidic system comprising an array of microchannels, each of said microchannel being provided with a plug-actuation device, with each plug-actuation device having a fluid driven plug and a pressure generation mechanism adjacent an outer surface of the fluid driven plug, said pressure generation mechanism adapted to drive the plug to slide along the microchannel in a direction away from the pressure generation mechanism when pressure is generated thereby, and having functions selected from the group consisting of pumping and valving, said plug-actuation devices being controlled to actuate independently to inject different fluids, to inject the same fluids, to control total dose, or total fluid injection over time, wherein for pumping the fluid driven plug displaces a fluid located in the microchannel adjacent an outer surface of the plug opposite the pressure generation mechanism, and for valving the fluid driven plug occludes and/or opens a path of another transversely-situated microchannel.

* * * * *